Aug. 16, 1955   W. T. LANG   2,715,277
TWO-VECTOR NAVIGATIONAL COMPUTER
Filed July 26, 1954
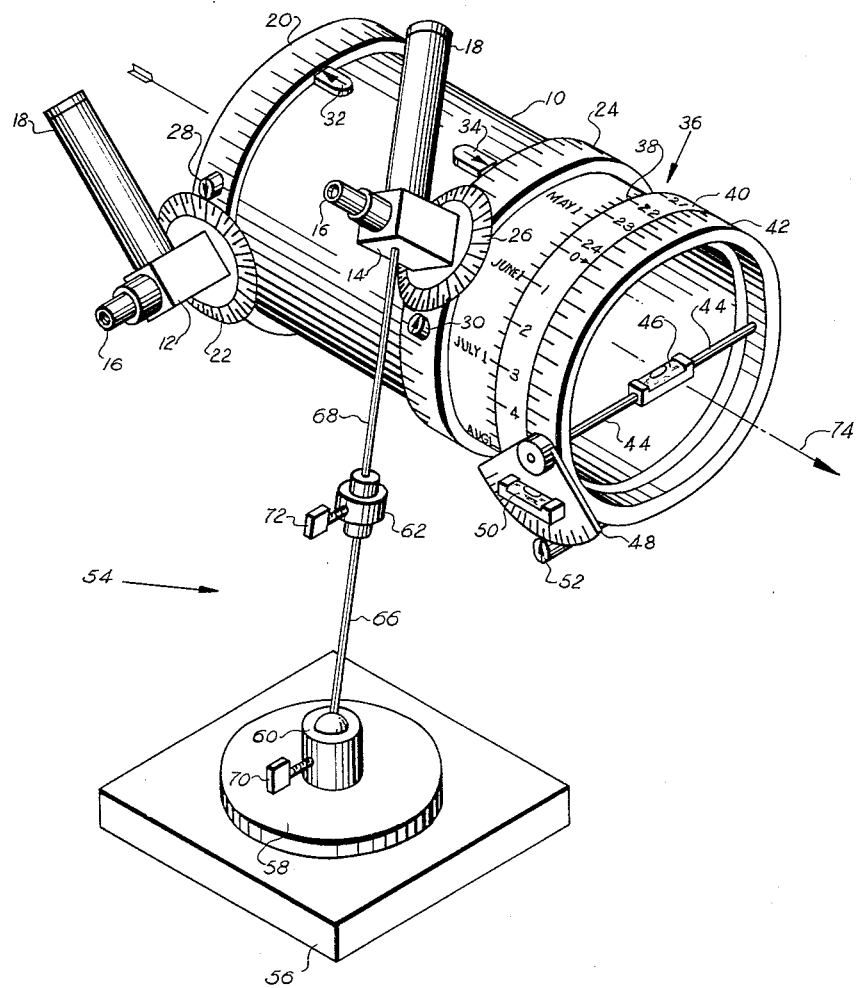
INVENTOR.
WALTER T. LANG
BY
Charles P. Boberg
ATTORNEY

United States Patent Office 2,715,277
Patented Aug. 16, 1955

2,715,277

TWO-VECTOR NAVIGATIONAL COMPUTER

Walter T. Lang, Brooklyn, N. Y., assignor to Control Instrument Company, Brooklyn, N. Y., a corporation of New York Application July 26, 1954, Serial No. 445,540

4 Claims. (Cl. 33—66)

This invention relates to instruments such as navigational computers, position finders and the like.

An important object of the present invention is the provision of a navigational instrument which may be so operated as to indicate its position in longitude and latitude directly without the use of auxiliary mathematical formulas, computations or plottings.

Another object of the invention is to provide a position finding instrument which will indicate, with accuracy, the position of the instrument either from two successive observations of a single celestial body or from simultaneous observations of two celestial bodies.

Another important object of the present invention is to provide a reliable position finding instrument which may be utilized by persons who are relatively unskilled in the art of navigation. To this end the design and operation of the instrument are such that if the observer should make an error in identifying a celestial body, the error will become apparent before the observation is completed. This will hold true whether the observer is to determine his position by observing either one or two celestial bodies.

The invention features a novel mounting for a navigational instrument which enables one of two sighting devices on the instrument to be fixed in a selected position relative to the earth's surface while the other sighting device is being trained upon a celestial body, the first sighting device having already been trained upon a given celestial body. This mounting includes a standard having a swivel base and a rotatable joint for fixing the first line of sight in a selected direction and rotating the second line of sight about the first line of sight as an axis, as will be described in greater detail hereinafter.

Other objects and advantages of the invention will be pointed out in the following description and claims and illustrated in the accompanying drawing, which discloses, by way of example, the principle of the invention and the best mode, which has been contemplated, of applying that principle.

The figure is an isometric view of a celestial navigation instrument embodying the principles of my invention.

The term "celestial body" as employed herein is intended to include planets, stars and other objects in the celestial sphere whose positions are known and recorded.

Referring to the drawing, the numeral 10 identifies a tubular mounting member on which two sighting devices 12 and 14 respectively are movably mounted. The two sighting devices 12 and 14 may be of any well known construction in which the portion 16 constitutes the eye piece while the tubular portion 18 is the sighting end.

In the instant invention each of the sighting devices 12 and 14 is presettable to the sidereal hour angle and declination of a celestial body known to the observer. Sighting device 12 is carried by a declination indicating element 22 mounted upon a sidereal hour angle indicating element 20. The declination indicating element 22 is rotatable about an axis which is constantly perpendicular to the axis of the sighting portion 18. The ring-like sidereal hour angle indicating element 20 is rotatable about the axis of the tube 10 and is tangent to the element 22. Sighting device 14, like the sighting device 12, is mounted upon a sidereal hour angle indicating element 24 and a declination indicating element 26. The indicating elements or dials 20, 22, 24 and 26 are calibrated in degrees and fractions of degrees, from 0 to 360. The calibrations have been shown in the drawing but, for the sake of clarity, the numeric designations are omitted.

Sidereal hour angle indicator 20 is mounted upon the outer surface of the tube 10 in a suitable manner to permit its rotation relative to tube 10. Declination indicator 22 is pivotally mounted on the indicator 20 so that it may be rotated relative to a marker 28 fixed on the indicator 20. Indicator 26 cooperates with a similar fixed marker 30 on the dial 24. The sighting devices 12 and 14 are secured to the dials 22 and 26, respectively, for rotation therewith. Markers 32 and 34 fixed on the tube 10 respectively cooperate with the sidereal hour angle dials 20 and 24.

Positioned at one end of the tube 10 is a time indicating means or unit generally identified by the numeral 36, which includes a date scale 38 calibrated according to months and days and an hour dial 40 calibrated according to the hours, minutes and possibly also seconds of a single day. The month and day indices are marked directly on the periphery of the tube 10 and in a predetermined angular relationship (to be described) with respect to the sidereal hour angle markers 32 and 34. Hour dial 40 is rotatably seated on the tube 10 next to the month and day scale 38 to cooperate therewith. The graduations on the dial 40 correspond to the divisions and subdivisions of Greenwich mean time. However, they have been laid out on the dial 40 is accordance with a reduced scale which is derived from the ratio between a sidereal day and a mean solar day. This contributes to the accuracy of the instrument by automatically converting the Greenwich time into its sidereal equivalent when the hour dial 40 is set.

The hour dial 40 has a marker (not numbered) at 0-hour which cooperates with the indices on an adjacent longitude dial or indicator 42. The ring-shaped longitude indicator 42, also rotatably mounted on the tube 10, is calibrated in angular degrees. The numeric designations of these calibrations have been omitted from the drawing. Within the dial or ring 42 is a level indicator 46 which is positioned on a diameter of the ring 42 and is connected by rods 44 to diametrically opposed points of the ring 42. The function of the device 46 will be explained presently.

One of the rods 44 extends out of the ring 42 and pivotally supports a latitude indicator 48. Mounted on the latitude indicator 48 is a leveling device 50, whose function will be described soon. Spaced along the lower arcuate portion of the segmental indicator 48 are a number of angular calibrations or indices which cooperate with a reference marker 52 secured to the ring 42 for indicating the lattitude of the instrument in degrees.

One of the important features of the invention is the mounting unit or standard 54, which enables the instrument to be oriented easily and accurately with reference to the celestial sphere. The illustrated unit 54 consists of a base 56, a plate 58 secured thereto, a supporting rod 66 connected by a ball-and-socket joint 60 to the plate 58, a supporting rod 68 aligned with the rod 66 and secured to the sight 14 in alignment with the sighting portion 18 thereof, and a rotatable joint 62 connecting the rods 66 and 68 and holding them in alignment while permitting relative rotation thereof about their common axis.

The ball-and-socket joint 60 enables the angularity of the supporting axis through the rods 66 and 68 to be adjusted for training the sighting device 14 upon a celestial body. By tightening the thumb screw 70 on the joint 60, the line of sight through the telescope or sighting device 14 may be held in a given angular position relative to the base 56. If necessary, this base 56 may be stabilized by gyroscopic means so that it remains parallel with the surface of the earth. The rotating joint 62 enables the whole instrument to be swung bodily about the line of sight through the telescope 14 (that is, the axis of the rods 66 and 68) for bringing the sighting device or telescope 12 into a desired position and thereby orienting the instrument in a predetermined relation to the celestial sphere. The thumb screw 72, when tightened, keeps the joint 62 from turning.

The illustrated instrument is adapted to be used for finding one's position by either of two methods. In the first method two celestial bodies are observed simultaneously through the sighting devices 12 and 14. In the second method the same celestial body is observed at one time through the sighting device 14 and at another time through the sighting device 12. These two methods are described in detail below:

*Simultaneous observation of two bodies*

Two visible celestial bodies are selected and identified by the observer. The sidereal hour angles and declinations of these two bodies then are ascertained from suitable reference tables or other sourcs. The sighting devices 12 and 14 are respectively set in accordance with the sidereal hour angles and declinations of the two bodies. The sidereal hour angle for the first body is set into the sighting device 14 by rotating the ring 24 until the proper index is aligned with marker 34. The declination is set into the sighting device 14 by rotating the indicator 26 until the proper index thereon is in alignment with marker 30. Sighting device 14 thus is preset to the sidereal hour angle and declination of the first known celestial body. In a similar fashion sighting device 12 is preset to the sidereal hour angle and declination of the second known celestial body, by manipulating elements 20 and 22.

When both of the sighting devices 12 and 14 have been preset, the thumb screws 70 and 72 on the mounting unit 54 are loosened. Tube 10 is then moved by pivoting the joint 60 until the sight 14 is directed toward the celestial body whose position has been preset therein. The screw 70 thereupon is tightened to lock the joint 60 and maintain the first line of sight fixed relative to the earth's surface. The next step is to swing or rotate the tubular body 10 about the axis of the rods 66 and 68 (that is, about the first line of sighting device) until the second sight 12 is aligned with the celestial body whose position has been preset therein. At this instant the Greenwich time is noted, and the screw 72 is tightened to prevent any further movement of the instrument.

If this operation is done rapidly, both of the sighting devices 12 and 14 may be trained upon their respective celestial bodies substantially simultaneously. The axis 74 of the tubular member 10 then will be positioned parallel to the axis of the earth, and the tube 10 also will be positioned angularly about this axis in such a way as to cause the time scale 38 thereon to occupy a predetermined angular position with respect to the equinoctial points on the celestial sphere. It is well known that a circular time scale may be positioned in a given relation to certain fixed points on the celestial sphere by sighting upon two known celestial bodies, but the particular method of accomplishing this as described above has not been proposed heretofore. The mounting unit 54 enables this orientation of the instrument to be performed quickly and accurately by progressively restricting the degrees of movement as described.

When the instrument has been thus oriented, the time scale 38 will have been so positioned that the point on this scale corresponding to the current day will indicate the position occupied by the plane of the Greenwich meridian as of the beginning of the current solar day. That is to say, a plane passed through said point and the reference axis 74, the figure, would be parallel to the plane of the Greenwich meridian at zero hour of the current day. To determine one's longitude, it first becomes necessary to ascertain the position occupied by the plane of the Greenwich meridian as of the present instant. This function is performed by rotating the hour ring 40 until the index mark thereon corresponding to the present Greenwich time is brought into alignment with the index mark on scale 38 corresponding to the date of the observation. The 0 mark on the dial 40 thereby is positioned so that a plane passed through it and the reference axis 74 will be parallel with the plane of the Greenwich meridian in its present position. The only step now remaining in the determination of the longitude is to measure the angular degrees separating the present Greenwich plane from the plane of the local meridian, that is, from the vertical plane. This measurement is performed by rotating the ring or dial 42 until the bubble in the leveling device 46 is centered, then reading the degrees of longitude directly from the dial 42 opposite the 0 index on the Greenwich time ring 40. By leveling the ring 42, its zero reference is brought into the vertical plane through the axis 74; hence it directly indicates the degrees separating the local meridian from the Greenwich meridian.

Since the axis of tube 10 is parallel to the earth's axis, the angle which the axis 74 of the tube makes with the horizontal is equal to the latitude of the instrument. Therefore, by pivoting the latitude indicator 48 to center the bubble in the level 50, the position in latitude of the instrument may be read directly on the scale 48 opposite the marker 52.

If an error has been made in identifying either one of the two celestial bodies selected for observation, this error will become apparent when the observer is unable to sight the second body through the telescope 12. He then knows that he must check the identities of the two bodies and reset his instrument before going further.

*Observations of a single celestial body*

To find one's position by observing a single celestial body, the instrument shown in the figure is manipulated to observe the same body respectively through the telescopes 12 and 14 at two different times. These two observations of one body will be equivalent to the aforementioned simultaneous observations made of two bodies. In making two observations of the same body at different times, the declination settings for both of the telescopes are the same, but the sidereal hour angle settings differ by an amount corresponding to the angle through which the earth has rotated during the time interval between the two successive observations.

The sidereal hour angle and declination position of the celestial body to be observed is preset into sighting device 14 for the time when it is determined that the observations will begin. Sighting device 12 is preset to the sidereal hour angle and declination position of the same celestial body for an observation or sight to be taken after the elapse of a predetermined time interval. The length of the time interval is of no consequence so long as it is sufficient to provide a reasonable degree of angular divergence between the two sighting devices 12 and 14. The sidereal hour angle and declination indicators 20, 22, 24 and 26 may be adjusted in the manner mentioned previously. Telescope 14 is aligned with the body at the time the first observation is to be made. Lock screw 70 then is tightened to prevent the rods 66 and 68 from swiveling about the base 56.

After the predetermined time interval has elapsed, telescope 12 is brought into line with the celestial body. To do this, the tube 10 is rotated about the joint 62 until the body is sighted a second time, through telescope 12 in this instance. Telescope 12 is then locked in position by tightening the screw 72. The Greenwich time at which this second observation is made is noted and set into the time unit 36, in the same manner described previously.

When the second telescope 12 has been oriented and fixed on the celestial body, the reference axis 74 of the tube 10 will be parallel to the axis of the earth and the tube 10 will have been oriented in a predetermined relation to the equinoctial points. The procedure for measuring the longitude and latitude is then carried out in the same manner as described previously.

If the observer is unable to sight the chosen celestial body during the second observation, this indicates that the celestial body has been identified incorrectly.

Thus, the invention disclosed herein will be seen to have greatly simplified the procedure for determining latitude and longitude, as well as eliminating some of the errors which commonly are made when using instruments of this general type.

While there have been shown and described and pointed out the fundamental novel features of the invention as applied to a preferred embodiment thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

The invention is claimed as follows:

1. A method of determining one's position in longitude and latitude by the observation of a single celestial body, using a navigational instrument in which two sighting devices are individually settable relative to a given reference axis of said instrument to correspond with individually selected declination and hour angle values, said method comprising the steps of setting the first sighting device to the declination and sidereal hour angle of said celestial body, setting the second sighting device to the declination of said celestial body and to an hour angle value which differs from the sidereal hour angle of said celestial body by a proportionate amount corresponding to a predetermined length of time, initially orienting said instrument to bring said first sighting device into line with said celestial body at a chosen initial time without disturbing the setting of said first sighting device relative to the rest of said instrument, maintaining the line of said first sighting device fixed in its relation to the earth's surface once said orientation has been accomplished, rotating said instrument bodily about said first line of sight into a final position where said second sighting device is aligned with said celestial body when said predetermined length of time has elapsed, thereby placing the reference axis of said instrument parallel with the earth's axis, locating a point on said instrument after it has attained said final position such that a plane passed through said point and said reference axis is parallel with the plane of the Greenwich meridian, measuring the angular displacement of said point about said reference axis from a vertical plane passed through said reference axis to obtain the longitude of the local meridian, and measuring the angle between said reference axis and a horizontal plane to obtain the local latitude.

2. A method of determining one's position in longitude by the observation of a single celestial body, using a navigational instrument in which two sighting devices are individually settable relative to a given reference axis of said instrument to correspond with individually selected declination and hour angle values, said method comprising the steps of setting the first sighting device to the declination and sidereal hour angle of said celestial body, setting the second sighting device to the declination of said celestial body and to an hour angle value which differs from the sidereal hour angle of said celestial body by a proportionate amount corresponding to a predetermined length of time, initially orienting said instrument to bring said first sighting device into line with said celestial body at a chosen initial time without disturbing the setting of said first sighting device relative to the rest of said instrument, maintaining the line of said first sighting device fixed in its relation to the earth's surface once said orientation has been accomplished, rotating said instrument bodily about said first line of sight into a final position where said second sighting device is aligned with said celestial body when said predetermined length of time has elapsed, thereby placing the reference axis of said instrument parallel with the earth's axis, locating a point on said instrument after it has attained said final position such that a plane passed through said point and said reference axis is parallel with the plane of the Greenwich meridian, and measuring the angular displacement of said point about said reference axis from a vertical plane passed through said reference axis to obtain the longitude of the local meridian.

3. In a navigational instrument or the like having a pair of sighting devices each of which can be adjusted individually and set in a selected position relative to a given reference axis of the instrument according to the declination and sidereal hour angle of a known celestial body, means adapted for use in conjunction with said sighting devices to position the instrument as a whole so that its reference axis is parallel to the axis of the earth, said means comprising a supporting device connected to one of said sighting devices for supporting the instrument thereby, a stationary base, and a universally adjustable connection between said supporting device and said base for enabling the instrument to be positioned with said one sighting device directed toward the celestial body to whose position it is set, said supporting device having a linear axis which at all times extends in the same direction as the line of sight of said one sighting device and including a rotatable joint for enabling the instrument to be rotated bodily about said linear axis for bringing the other sighting device into alignment with the celestial body to whose position it is set.

4. In a navigational instrument or the like, a pair of sighting devices each adapted to be adjusted individually and set in a selected position relative to a given reference axis of the instrument according to the declination and sidereal hour angle of a known celestial body, a supporting device connected to one of said sighting devices for supporting the instrument thereby, a stationary base, a universally adjustable connection between said supporting device and said base for enabling the instrument to be positioned with said one sighting device directed toward the celestial body to whose position it is set, said supporting device having a linear axis which at all times extends in the same direction as the line of sight of said one sighting device and including a rotatable joint for enabling the instrument to be rotated bodily about said linear axis for causing the other sighting device to become aligned with the celestial body to whose position it is set, thereby orienting the instrument in a predetermined manner relative to the celestial sphere, time indicating means on said instrument having reference indicia adapted to be operatively positioned in a predetermined manner as an incident to said orientation of said instrument, said time indicating means also including a portion having a second set of indicia adapted to be positioned selectively in relation to said reference indicia according to the current Greenwich date and time, longitude indicating means adjustable to a predetermined position and cooperating with said time indicating means while in said predetermined position to indicate the position of said instrument in longitude, and latitude indicating means having a first index portion which is positioned as an incident to said orientation of said instrument and a second index portion which is adjustable to a given position for cooperating with said first index portion to indicate the position of said instrument in latitude.

References Cited in the file of this patent

UNITED STATES PATENTS

| Re. 22,670 | Millar | Aug. 28, 1945 |
| 2,688,896 | Tripp | Sept. 14, 1954 |

FOREIGN PATENTS

| 105,371 | Great Britain | Apr. 5, 1917 |
| 840,326 | France | Jan. 16, 1939 |